W. A. McDonald,
Dovetailing Machine.
N° 25,431.          Patented Sep. 13, 1859.
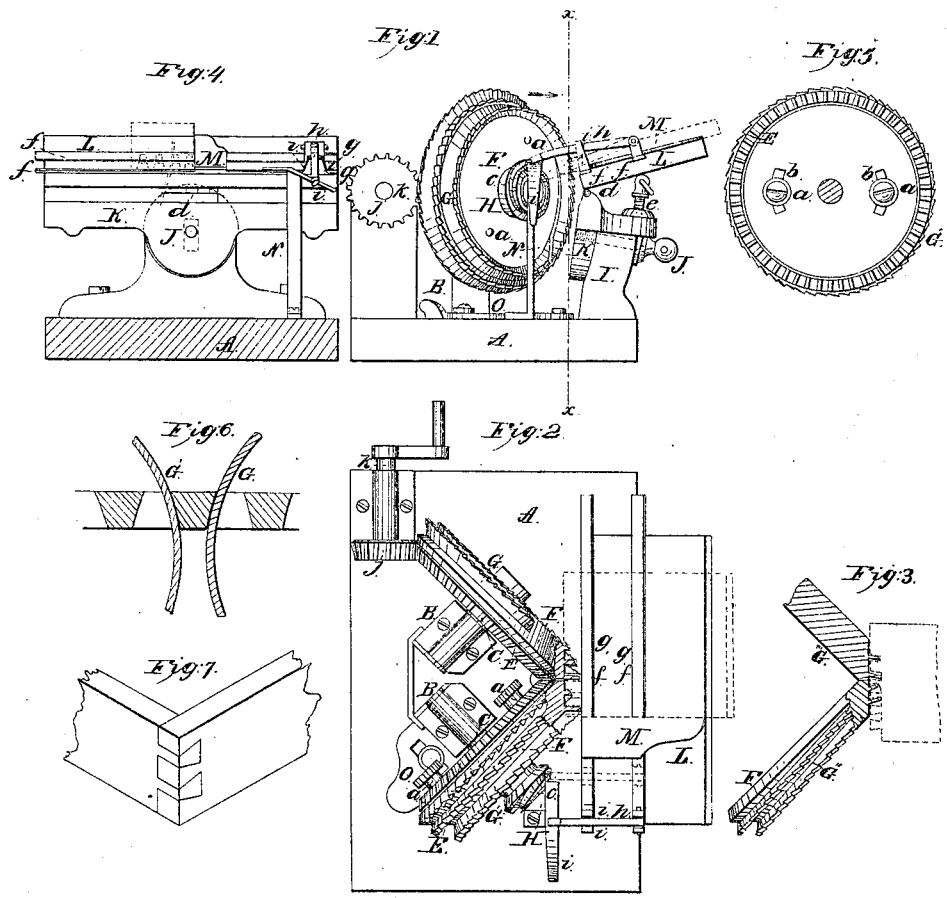

UNITED STATES PATENT OFFICE.

W. A. McDONALD, OF MOTT HAVEN, NEW YORK.

DOVETAILING-MACHINE.

Specification of Letters Patent No. 25,431, dated September 13, 1859.

*To all whom it may concern:*

Be it known that I, W. A. McDonald, of Mott Haven, in the county of Westchester and State of New York, have invented a new and Improved Machine for Making Dovetail Joints; and I do hereby declare that the following is a full, clear, and exact description of the same, reference being had to the annexed drawings, making a part of this specification, in which—

Figure 1, is an end view of my invention. Fig. 2, a plane or top view of the same. Fig. 3, a horizontal sectional view of two of the cutters of the same. Fig. 4, a vertical section of the same, taken in the line $x$, $x$, Fig. 1, and looking in the direction indicated by the arrow. Fig. 5, a detached back view of one of the cutter wheels. Fig. 6, a diagram designed to illustrate the action of the cutters. Fig. 7, a perspective view of a dovetail joint.

Similar letters of reference indicate corresponding parts in the several figures.

This invention consists in the employment or use of two rotating cutter wheels the planes of rotation of which have oblique positions relatively with each other and which cutter wheels are provided at their peripheries with spiral saw-toothed cutters and using in connection with the above an adjustable gage so arranged as to permit the cut to be commenced at any desired point in the work and also using an adjustable platform whereby the position of the work relatively with the cutters may be regulated as may be required.

To enable those skilled in the art to fully understand and construct my invention I will proceed to describe it.

A, represents a bed-piece to which two uprights B, B, are attached, the upper surface of said uprights forming bearings for shafts C, C, which are placed obliquely with each other as shown clearly in Fig. 2. To each shaft C, a bevel wheel E, is attached, said wheels gearing into each other, and to one side of each wheel a circular cutter head F, is attached concentrically. These cutter heads have spiral saws or cutters G, G', on their peripheries one on each, and the cutters project at right angles from the peripheries of the cutter heads having oblique positions and the cutters making each nearly three revolutions around its cutter head. The cutter G, gradually projects farther out from the periphery of its head F, as it approaches the larger diameter of its periphery and the cutter G', gradually projects farther out from the periphery of its head F, as it approaches the smaller diameter of said head, see Fig. 2.

The cutter heads F, F, are attached to the bevel wheels E, E, by means of screws $a$, $a$ and one head F, may be provided with curved or segment slots $b$, $b$, (Fig. 5,) through which its screws $a$, pass to admit of a certain adjustment of the head relatively with its fellow so that the two cutters G, G', may have the proper relative position with each other.

One head F has its hub H, grooved spirally as shown at $c$, to form a screw the pitch of which coincides with that of the cutters G, G'.

To the bed piece A, a standard I, is attached, said standard being slotted vertically and having a set screw J, passing through it and into a slide K, to the upper edge of which a platform L, is connected at its inner edge by a hinge or joint $d$, and set screws $e$, $e$, are attached to the standard which set screws form bearings for the platform and allow it to be adjusted in a more or less inclined position as may be desired. The set screw J, permits the platform to be secured in a more or less elevated position as circumstances may require.

On the platform L, a sliding gage M, is placed. This gage is merely a plate attached to two bars $f$, $f$, which are let in longitudinal grooves $g$, in the platform and allowed to slide freely therein. One of these bars $f$, has a rod $h$, attached to it by a joint, said rod fitting between guides $i$, $i$, on the other bar $f$.

To the bed piece A, an upright N, is attached, said upright having an elastic curved bar $i$, attached to its upper end.

In one of the wheels E, a pinion $j$, gears said pinion being placed on the driving shaft $k$, to which any convenient power may be applied.

The operation is as follows:—One of the pieces to be connected by a dovetail joint, the one on which the tenons are to be cut, shown in red Fig. 2, is placed transversely on the platform L, and against the gage M, the latter being so adjusted that the cut which is first made by cutter G, will be commenced at the desired spot. The end of the rod $h$, is then fitted in the spiral groove $c$, and motion being given the shaft $k$, both cutter heads F, will be rotated and the cutters G, G', will cut longitudinally into the ends of the piece but both will make an oblique cut downward and one in an opposite direction to the other so that the lower edges of the tenons will be narrower than the upper edges as shown clearly in Fig. 6. The spaces between the tenons are fully taken out by the saws and the cutters G, G', owing to their spiral form feed the piece of stuff operated on along on the platform.

The gage M, it will be seen is first fed along for a short distance in consequence of the rod h, fitting in the screw or spiral groove c. The vertical adjustment of the platform L, by the screw J, determines the inclination of the sides of the tenons and the adjusting of the platform in a more or less inclined position by means of the screws e, determines their inclination so as to suit a right angled joint or other joints which connect pieces forming angles with each other greater or less than a right angle. The elastic bar i, raises the rod h, during the return motion of the gage and permits it to pass in proper position back of the screw c, for a succeeding operation. One of the uprights B, may be attached to an adjustable plate O, so that its position may be changed in order to insure at all times a proper relative position of the two shafts C, C.

In order to cut the recesses to receive the tenons cutters G." G."' are employed as shown in Fig. 3. These cutters are precisely the same as G, G', and are attached to similar cutter heads F, but the cutters G", G"', project from their heads obliquely so as to cut diagonally into the piece and form dovetail recesses as shown clearly in Fig. 3, to receive the tenons cut by the cutters G, G'. The two pieces adjusted together are shown in Fig. 7.

I would remark that by using one of the cutters for each piece to be joined oblique, dovetail joints may be made for ordinary box joints and common work. I would also remark that by inclining the platform L, longitudinally which is permitted by the screw J, an oblique form will be given the same joint as shown in Fig. 7.

Having thus described my invention what I claim as new and desire to secure by Letters Patent, is—

1. The employment or use of spiral saw-cutters G, G', and G", G"', attached to rotating heads F, connected by gearing E, for the purpose specified.

2. In combination with the cutters G, G', and G", G"', the adjustable platform L, and 3. The combination of the cutters G, G', G", G"', platform L, and gage M, operated by the screw c, for the purpose set forth.

W. A. McDONALD.

Witnesses:
M. M. LIVINGSTON,
MICH. HUGHES.